Oct. 19, 1948.　　　W. H. CHURCHILL　　　2,451,808
FLOATING COWL FASTENER CONSTRUCTION
Filed June 9, 1944

Inventor
Wilmer H. Churchill.
By Walter S. Jones
Attorney

Patented Oct. 19, 1948

2,451,808

UNITED STATES PATENT OFFICE 2,451,808

FLOATING COWL FASTENER CONSTRUCTION

Wilmer H. Churchill, Saugus, Mass., assignor to United-Carr Fastener Corporation, Cambridge, Mass., a corporation of Massachusetts Application June 9, 1944, Serial No. 539,569

3 Claims. (Cl. 24—221)

1

The present invention relates to improvements in rotary operative type fasteners, such as those employed for connecting airplane cowling sheets together, and aims generally to improve existing fasteners of that type.

More particularly the invention provides an improved construction of female fastener member and an attaching plate therefor whereby the female fastener member may be floatingly and shiftably mounted upon an apertured support, and the invention is an improvement over the construction shown in my prior co-pending application Serial No. 458,239, filed September 14, 1942, Patent No. 2,407,815, issued September 7, 1946, in that it provides increased strength and decreased weight in the fastener which is highly desirable in aircraft installations.

Illustrative of the invention, reference is made to the accompanying drawings showing preferred forms of the invention, and in which.

Figure 1:
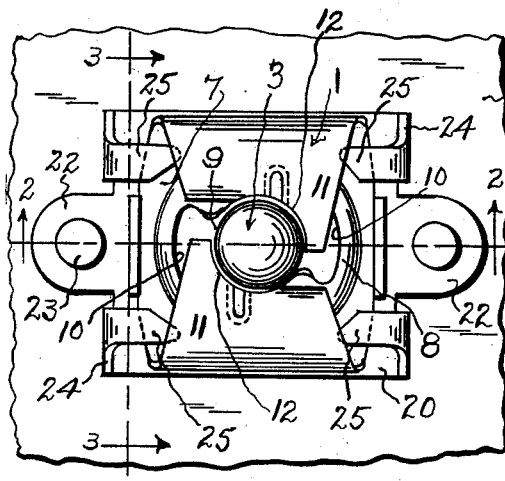
Fig. 1 is a plan view of a fastening installation as viewed from the female fastener side thereof and illustrating my improved fastener member.

Referring more particularly to the drawings, the invention provides new and improved means for shiftably attaching a female socket or fastener member to a suitable apertured support, such as an airplane cowling sheet, though it is to be understood that the invention is susceptible of general application and is not restricted to such use.

Rotary operative fasteners, such as those used for securing airplane cowling sheets together, usually include a stud-engaging part variously termed as female fastener or socket member 1 suitably attached to one side of an apertured supporting sheet 2 and adapted to receive and interlock with a rotary male fastener member 3 rotatably mounted in a part 4 to be secured to the support 2. The rotary male fastener element preferably is formed with lateral projections or extensions 5, such as radial arms adapted to overlie and be engaged with a locking seat 6 of the female fastener member 1 upon rotary or turning movement of the male member 3. The seat 6 is spaced outwardly from the support 2

2 and thus when engaged by the extensions 5, the support 2 and part 4 are held in rigid fastened relationship.

The stud-engaging part or female fastener member may be of any approved type and construction to receive and lockingly cooperate with the rotary male element 3. In the illustrated form of the invention the member 1 may be of the type disclosed and claimed in the United States patent of William A. Bedford, No. 2,306,928, granted December 29, 1942.

Such socket members advantageously comprise a base portion 7 formed with an outwardly dished embossment 8 having a central aperture 9 to receive the end of and provide a seat for the stud or male member 3. The aperture 9 is preferably formed with radial elongations 10 to permit the passage of the radial arms 5 of the stud 3. The marginal edges of the apertures 9 and 10 present upwardly sloping cam seats 6. Resilient wings 11 may extend from the base 7 upwardly and inwardly over the seat, the inner edges thereof being notched as at 12 to permit the passage of the end of the stud 3, the wings 11 being designed to engage and lock with the extensions 5 when the male member or stud 3 is rotated to locked position.

The socket member 1 employed with the present invention is provided with spaced upstanding projections or stops 14, preferably formed integral with the base and on diametrically opposite ends thereof, and the base portion 7 of the socket surrounding the outwardly dished embossment 8 provides a sliding bearing surface for engagement with the attaching member or plate.

The invention provides an improved attaching member or plate for mounting the female fastener or socket member 1 and for shiftably attaching it to its support 2 overlying the aperture thereof. According to the invention the attaching plate comprises a substantially flat base or bearing plate 20 (Figs. 2 and 3) formed of relatively thin material to provide lightness in weight of the fastening. The plate 20 may be rectangular in form and provided with a relatively large central aperture 21 of substantially greater diameter or size than the aperture 9 and elongations 10 of the embossment 8 of the socket member 1. The plate 20 is preferably formed with apertured ears or extensions 22 for the reception of rivets or like fastenings 23 by means of which the plate may be secured to the support 2 and advantageously these extensions 22 extend from or are formed in opposite ends of the plate 20.

The end portions of the plate or member 20 on opposite sides of the attaching ears or extensions 22 are preferably bent angularly to the apertured base portion of the plate to provide outwardly extending spacing means 24 having angularly disposed retaining means 25 extending inwardly from the spacing means and overlying the plate 20 in spaced relation thereto. The retaining means 25 may be in the form of fingers spaced above the apertured base portion of the attaching plate 20 a sufficient distance to permit the base 7 of the socket fastener member 1 to be floatingly mounted therebetween. The distance between the opposed spacing means 24 at opposite ends of the plate 20 exceeds the length of the base 7 of the socket member 1 and the spacing between the fingers or retaining means 25 at one end of the plate 20 is greater than the length of the stop 14 of the socket member 1, so that the floating socket member is shiftably mounted and retained relative to the opening in the support 2. As will be apparent, the stops 14 are disposed between pairs of retaining means 25 and limit shifting of the stud-engaging part 1 relative thereto and thus prevent any binding between the retaining means 25 and the outwardly dished embossment 8 of the socket part 1.

Figure 3:
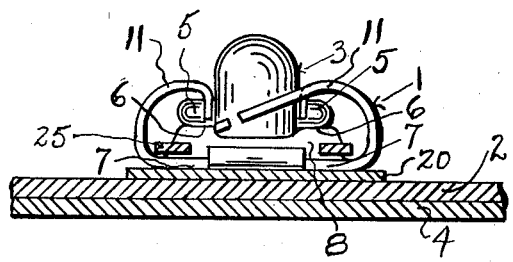
Fig. 3 is a transverse section taken on the line 3—3 of Fig. 1.
Figure 4:
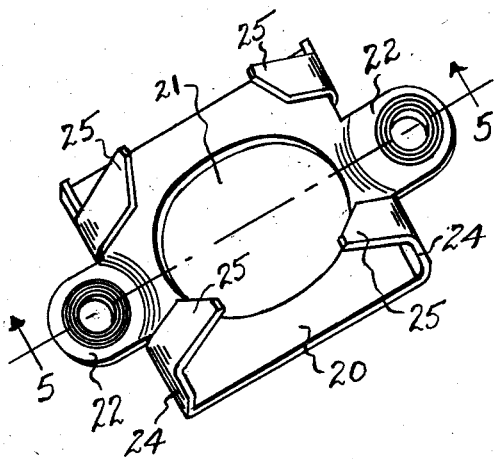
Fig. 4 is a detail perspective view of a slightly modified form of attaching plate.
Figure 5:
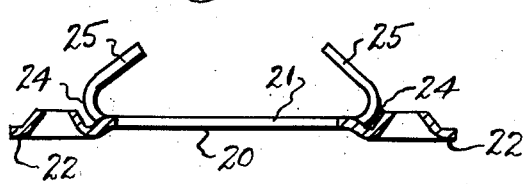
Fig. 5 is a sectional view of the modified attaching plate taken on the line 5—5 of Fig. 4.

In assembling the socket member 1 and attaching plate 20 the latter is initially formed, as illustrated in Fig. 4, with the retaining fingers outstanding in angular relation and tapering inwardly as best shown in Fig. 5. The socket member may be assembled with the attaching plate by inserting the base portion thereof under two of the retaining fingers 25 at one side and then shifting it under the other two fingers at the opposite side. The retaining means or finger 25 may then be bent to the position shown in Figs. 1, 2 and 3 so that they overlie the base portion 7 of the socket fastener member 1. The assembled fastener member 1 and attaching member 20 may then be heat-treated as a unit and plated as desired.

Figure 2:
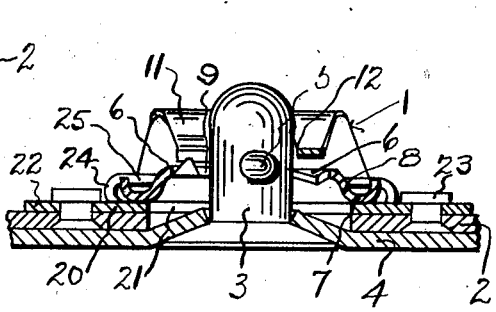
Fig. 2 is a longitudinal central sectional view of the installation as taken on the line 2—2 of Fig. 1.

The attaching member shown in Figs. 4 and 5 is the same as shown in Figs. 1, 2 and 3 except that the ears 22 are bent where they join the bearing plate 20. In this manner the plate 20 is spaced away from the support to provide some slight flexibility to the installation without affecting shiftability of the socket member 1. Also, the metal is cone-shaped around the apertures in the ears 22 to permit a different riveting operation than when a flat apertured ear is provided.

The advantages of the present invention reside in the simplicity of construction of a shiftably mounted rotary operative fastener member, the utilization of light weight metal to reduce weight of the fastening as well as the increased strength thereof and resistance to displacement of the socket member 1 from the support 2 under extreme loads and strains. It will be noted that forces tending to displace the socket member 1 from the support 2 are resisted by the fingers or retaining means 25 which are disposed in planes closely adjacent and parallel to the longitudinal axis of the attaching plate as taken through the attaching fastenings 23. This provides a much stronger construction than prior installations where a single retaining means engages one side of the socket member along lines disposed in a plane normal to a plane through the attaching rivets.

While I have illustrated and described preferred embodiments of the invention, I do not wish to be limited thereby because the scope of my invention is best defined by the following claims.

I claim:

1. A fastener member for detachably connecting an apertured support and a stud-carrying part to be attached thereto, said fastener member comprising a stud-engaging part having a base provided with a central outwardly dished apertured embossment providing a stud-engaging seat, the portions of said base surrounding said embossment providing slidable bearing sections, and means for shiftably connecting said stud-engaging part to the support comprising an elongated attaching member having an apertured base of greater length than the length of the base of the stud-engaging part and adapted to be rigidly attached to a support at longitudinally spaced points, spacing means at opposite end portions of the attaching member base, pairs of retaining members extending from the spacing means and loosely overlying portions of the bearing sections of said stud-engaging part base radially spaced from the outwardly disposed seat thereof, said stud-engaging part being bodily shiftable longitudinally between said spacing members and laterally under said retaining members, and stop means on the end portions of the stud-engaging part interposed between each pair of retaining members for engagement with said retaining members radially inwardly of said spacing means for limiting lateral shifting movement of the stud-engaging part relative to the attaching member to prevent binding between the retaining members and the outwardly disposed seat of the stud-engaging part.

2. A fastener member for detachably connecting an apertured support and a stud-carrying part to be attached thereto; said fastener having a base provided with a central outwardly dished apertured embossment providing a stud-engaging seat, the material of said base surrounding said embossment providing a substantially continuous annular bearing surface of substantial width, a plate-like attaching member for said fastener having longitudinally spaced apertured attaching extensions and an enlarged central aperture adapted to be shiftably aligned with said fastener seat and opposed pairs of fastener-retaining tongues connected to said plate in planes intermediate the central aperture and apertures of the attaching extensions and overlying the bearing surface of said base transversely removed from said attaching extensions and adjacent the embossment thereon, and stop means on said fastener member disposed between and cooperating with tongues of each pair inwardly of the plane of connection of said tongues to said plate.

3. A fastener member for detachably connecting an apertured support and a stud-carrying part to be attached thereto; said fastener having a base provided with a central outwardly dished apertured embossment providing a stud-engaging seat, the material of said base surrounding said embossment providing a substantially continuous annular bearing surface of substantial width, a plate-like attaching member for said fastener having longitudinally spaced attaching openings and an enlarged central aperture adapted to be shiftably aligned with said fastener seat and opposed pairs of fastener-retaining tongues connected to said plate in planes intermediate the central aperture and end-attaching openings and overlying the bearing surface of said base adjacent the embossment thereon, the tongues of each pair being disposed on opposite sides of and extending in a direction substantially parallel to the longitudinal axis of said plate passed through said end attaching openings, and angularly disposed stop members on said fastener base disposed between said opposed tongues of each pair and having a transverse dimension of less than the spacing between said opposed tongues.

WILMER H. CHURCHILL.

REFERENCES CITED

The following references are of record in the file of this patent:

UNITED STATES PATENTS

| Number | Name | Date |
|---|---|---|
| 2,322,614 | Bedford, Jr. | June 22, 1943 |
| 2,413,510 | Luce | Dec. 31, 1946 |